(12) United States Patent
Tsuji et al.

(10) Patent No.: US 7,070,529 B2
(45) Date of Patent: Jul. 4, 2006

(54) POWER TRANSMISSION BELT

(75) Inventors: Katsuji Tsuji, Osaka (JP); Takehiko Ito, Kakogawa (JP)

(73) Assignee: Mitsuboshi Belting Ltd. (JP)

( * ) Notice: Subject to any disclaimer, the term of this patent is extended or adjusted under 35 U.S.C. 154(b) by 111 days.

(21) Appl. No.: 10/157,613

(22) Filed: May 29, 2002

(65) Prior Publication Data

US 2003/0087716 A1 May 8, 2003

(30) Foreign Application Priority Data

May 30, 2001 (JP) ..................... 2001-161648

(51) Int. Cl.
*F16G 1/00* (2006.01)

(52) U.S. Cl. ..................... 474/242; 474/201
(58) Field of Classification Search ............... 474/204, 474/240, 242, 246, 255
See application file for complete search history.

(56) References Cited

U.S. PATENT DOCUMENTS 4,655,732 A * 4/1987 Takashima .................. 474/201
6,500,086 B1 * 12/2002 Serkh et al. ................ 474/245

FOREIGN PATENT DOCUMENTS

| JP | 62-151646 | 7/1987 |
|----|-----------|--------|
| JP | 63-034342 | 7/1988 |
| JP | 02-064132 | 3/1990 |
| JP | 05-077651 | 10/1993 |
| JP | 09/025999 | 1/1997 |

OTHER PUBLICATIONS

Mark's Standard Handbook for Mechanical Engineers, McGraw–Hill, $10^{th}$ Edition, Table 6.12.1.*

* cited by examiner

*Primary Examiner*—David A. Bucci
*Assistant Examiner*—Vicky A. Johnson
(74) *Attorney, Agent, or Firm*—Wood, Phillips, Katz, Clark & Mortimer

(57) ABSTRACT

A power transmission belt having a load carrying band with a length, and a plurality of blocks attached to the load carrying band at preselected, spaced intervals along the length of the load carrying band. The plurality of blocks have a thickness (t), measured in a direction along the length of the load carrying band, and a width (W), measured in a direction transversely to the length of the load carrying band. Each of the plurality of blocks is made from synthetic resin material and has no shape-determining insert therein. The synthetic resin material is made from a synthetic resin having a bending modulus of 15 to 20 GPa. The ratio of t/W is from 0.11 to 0.20.

14 Claims, 2 Drawing Sheets

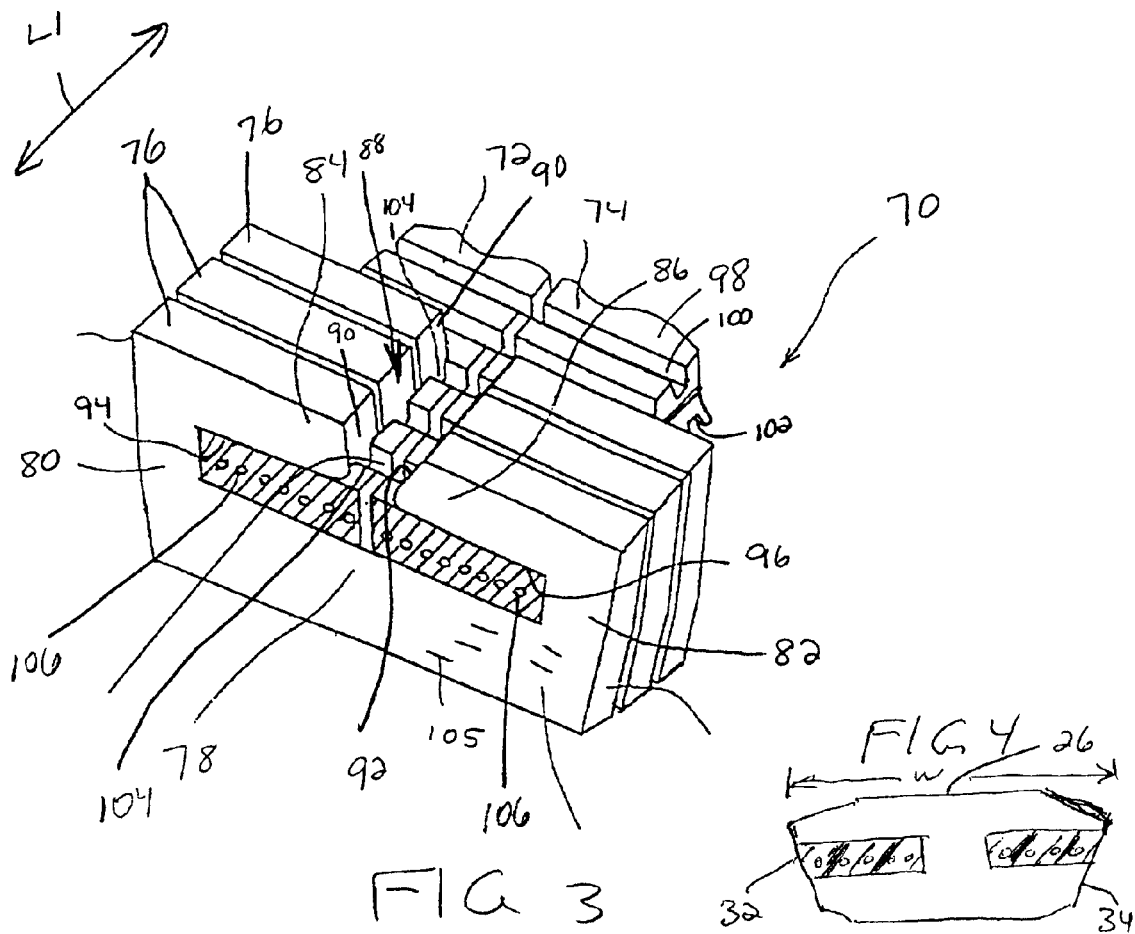
FIG 3
FIG 4
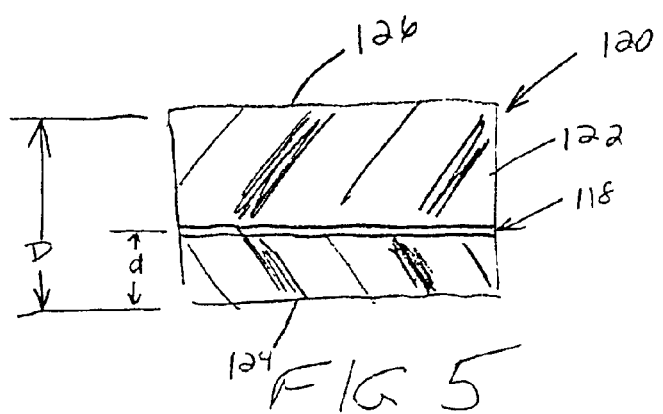
FIG 5

POWER TRANSMISSION BELT

BACKGROUND OF THE INVENTION

1. Field of the Invention

This invention relates to power transmission belts and, more particularly, to a power transmission belt having a load carrying band with a plurality of blocks mounted at preselected spaced internals along the length of the load carrying band.

2. Backgroud Art

Belt-operated, speed changing, drive mechanisms are commonly used in many different environments. To effect speed change, variable speed pulleys are utilized. The variable speed ratios are selected by varying the effective diameters of the pulleys about which the operating belt is trained. The pulley diameters are effectively varied by changing the widths of the V-shaped grooves on the pulleys.

To operate in this environment, power transmission belts need to have a good resistance to high, laterally directed forces from pulleys with which they interact. Belts with high load transmission capability are required not only in this environment, but for diverse applications in many other environments. Generally, ordinary rubber belts do not have the necessary life expectancy in these high load environments.

It is common to make power transmission belts in high load pulling environments with a center belt and a plurality of blocks secured at regular intervals along the length of the center belt. The blocks enhance the lateral strength of the power transmission belt. Typically, the blocks are firmly fixed to the center belt by means of bolts or rivets. The center belt is commonly formed from an elastomer, made of rubber or the like, with a load carrying member embedded therein and extending lengthwise of the belt. The blocks are formed from a more rigid elastomer than the elastomer used for the center belt.

Blocks for high load power transmission belts used for pulling are designed for high load, frictional transmission. Thus, the block must have a good balance between many of its properties, among which are flexing fatigue resistance, wear resistance, heat resistance, rigidity, shock resistance, etc. It is also important that the blocks not cause wear on cooperating pulleys.

One high load power transmission belt designed to meet these requirements is disclosed in Japanese Unexamined Patent Laid-Open Publication No. 63-34342. This belt uses a double block in which an insert, made of metal or the like, is covered with a resin molding material, consisting of a phenol resin component mixed with a rubber component, at the portion of the block intended to abut a cooperating pulley.

Japanese Patent Publication No. 7-110900 discloses a high load power transmission belt with blocks formed from a phenol resin. Two types of fibers, carbon and aramid, are incorporated therein using an acrylonitrile-butadiene rubber as a matrix. In the phenol resin, the fiber is present in the range of 25 to 60 parts by weight. The carbon fiber is of an onion structure, with the crystalline layer thickness in the range of 25 to 200 μm.

To meet the diverse demands of many different industries, there is a need for a high load power transmission belt that, while capable of high load transmission, sacrifices some load transmission capability in order to make it suitable to run at high speeds.

In Japanese Patent Laid-Open Publication No. 63-34342, a belt is shown having block inserts made from aluminum alloy, or the like. At high speeds, significant centrifugal forces are generated due to the weight of the inserts. This type of belt is prone to becoming highly tensioned and failing prematurely.

High speed travel of a belt generates a significant amount of heat between the pulleys and blocks. A block made primarily of phenol resin, as disclosed in Japanese Patent Publication No. 7-110900, may be prone to breaking, since the phenol resin is not highly resistant to shock. Thus, unless the properties of the belts are changed to overcome these deficiencies, the demands on the above-noted high load power transmission belts may not be adequately met.

Another problem is that the phenol resin accounts for an extended molding cycle and reduced recycling, since it is a thermosetting resin.

As an alternative to the aforementioned high load pulling transmission belts utilizing load carrying bands attached to blocks through bolts or rivets, Japanese Unexamined Patent Application Publication No. 63-34342 discloses a belt with blocks having recesses cut on opposite sides thereof to interengage with a pair of load carrying bands.

Belts of the above type, used in variable speed transmissions in a pulling mode, are often required to travel around small diameter pulleys. As belts of this type are brought into engagement with a pulley, particularly a small diameter pulley, the load carrying bands become sandwiched on the inner peripheral compression side thereof, between the blocks, and may cause a stress concentration. Load carrying bands made from rubber tend to deteriorate, which may result in cracking of the rubber or cutting of the belt.

To relax this stress concentration in load carrying bands, one proposed solution is set forth in Japanese Unexamined Patent Application Publication No. 62-151646. In this belt, the upper end of a convex portion formed on the inside surface of a load carrying band is positioned above the lower end of a convex portion formed on each block. As a result, when the belt engages with a pulley and buckles, the convex portion of the load carrying band is prevented from being sandwiched between the blocks.

Additionally, Japanese Unexamined Patent Application Publication No. 9-25999 discloses a belt in which the radius of curvature of a convex portion formed in a block is selected to be smaller than the radius of curvature of a concave portion cut on the inside surface of a load carrying band, at a location where the block and load carrying band interengage. As a result, a gap is maintained therebetween.

With the structures disclosed in Japanese Unexamined Patent Application Publication Nos. 62-151646 and 9-25999, the problems of stress concentration on the inside surface of a load carrying band due to buckling of the belt, and hence cracking of the load carrying band, or deterioration of the rubber material, or the like, due to heat generation in use, is somewhat diminished.

The load carrying bands flex, particularly in small diameter pulleys owing to the geometry of the blocks as they interact with the small pulleys. As result of this bending, the load carrying bands are considerably compressed on their inner side surfaces and thereby subject to considerable internal heat generation. As a result, the load carrying bands are prone to deterioration and/or the resinous block mounted thereon may become softened and may break. To the knowledge of the inventors herein, the above problems still exist in the art.

SUMMARY OF THE INVENTION

In one form, the invention is directed to a power transmission belt having a load carrying band with a length, and a plurality of blocks attached to the load carrying band at preselected, spaced intervals along the length of the load carrying band. The plurality of blocks have a thickness (t), measured in a direction along the length of the load carrying band, and a width (W), measured in a direction transversely to the length of the load carrying band. Each of the plurality of blocks is made from synthetic resin material and has no shape-determining insert therein. The synthetic resin material is made from a synthetic resin having a bending modulus of 15 to 20 GPa. The ratio of t/W is from 0.11 to 0.20.

In one form, the synthetic resin material is polyamide resin.

Reinforcing fibers may by present in the polyamide resin in an amount of from 15 to 40 wt. %. The reinforcing fiber may be carbon fiber.

The polyamide resin may be nylon 46.

In one form, the load carrying band is made from an elastomer material.

A load carrying member may be embedded in the load carrying band and extends lengthwise of the load carrying band.

The load carrying band has an inside surface and an outside surface. In one form, the load carrying member is located closer to the inside surface than to the outside surface of the load carrying band.

In one form, the load carrying member is located outwardly from the inside surface a distance from 30 to 48% of the height of the load carrying band.

The load carrying member may be rope that is made from at least one of: polyester fiber; polyamide fiber; aramid fiber; glass fiber; and steel wire.

The load carrying member may be in the form of a sheet.

In one form the sheet may be at least one of: woven cloth; knitted cloth; and metal.

The invention is further directed to a power transmission belt having a load carrying band with a length, and a plurality of blocks attached to the load carrying band at preselected spaced intervals along the length of the load carrying band. The load carrying band has a load carrying member extending lengthwise of the load carrying band. The load carrying band has an inside surface and an outside surface and a height between the inside surface and the outside surface. In this embodiment, the load carrying member is located closer to the inside surface than to the outside surface of the load carrying band.

The load carrying band may be made from an elastomer material.

In one form, the load carrying member is located outwardly from the inside surface a distance from 30–48% of the height of the load carrying band.

In one form, the plurality of blocks are made from synthetic resin material with no shape-determining insert therein.

The synthetic resin material may be made from synthetic resin having a bending modulus of 15 to 20 GPa.

In one form, the plurality of blocks have a thickness (t) measured in a direction along the length of a load carrying band, and a width (W) measured in a direction transversely to the length of the load carrying band, with the ratio of t/W being from 0.11 to 0.20.

Reinforcing fibers may be provided in the plurality of blocks in an amount of from 15to 40 wt. %.

The invention is further directed to a block for attachment to a load carrying band to form a power transmission belt. The block has a body made from a synthetic resin material with no shape-determining insert therein. The synthetic resin material is synthetic resin having a bending modulus of 15 to 20 GPa.

In one form, the block has an inside surface, an outside surface, laterally spaced side surfaces, leading and trailing surfaces, a width (W) measured between the laterally spaced side surfaces, and a thickness (t) between the leading and trailing surfaces. The ratio of t/N is from 0.11 to 0.20.

In one form, reinforcing fibers are present in the block in an amount of 15 to 40 wt. %.

DETAILED DESCRIPTION OF THE DRAWINGS

Figure 1:
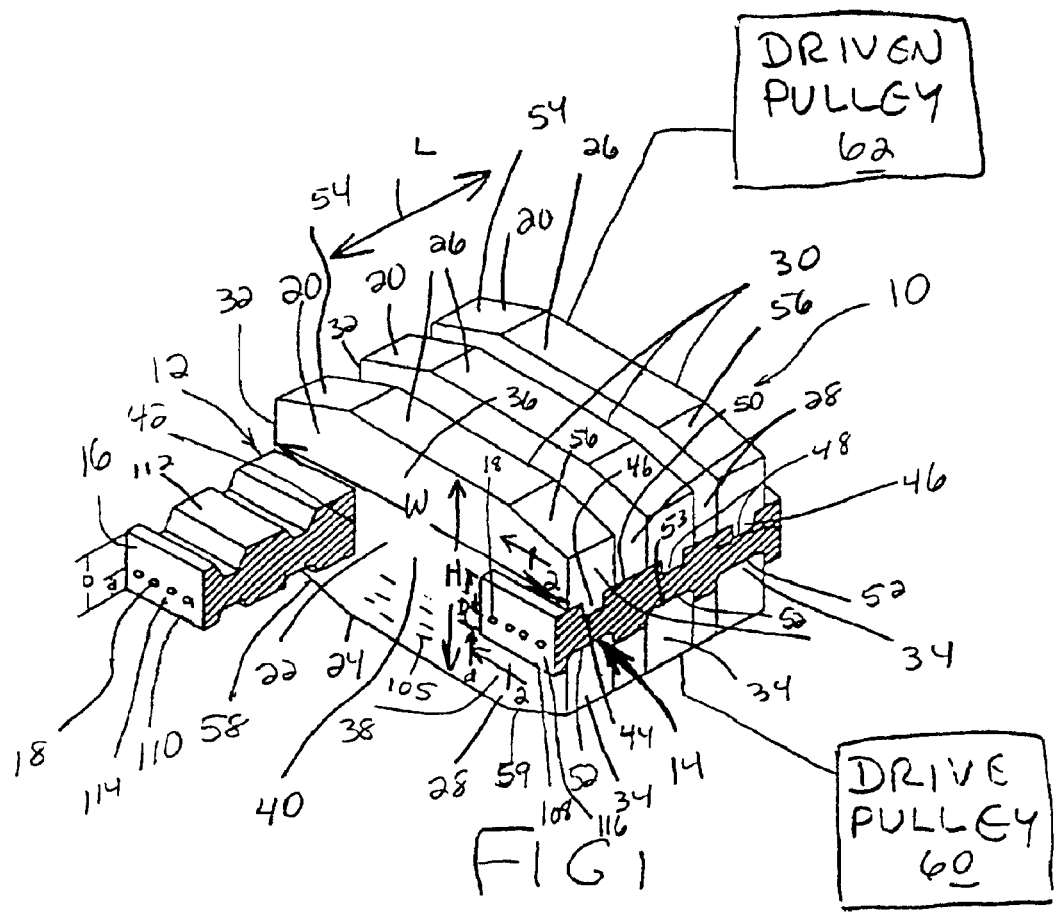
FIG. 1 is a partial cross-sectional, perspective view of one form of high load power transmission belt, according to the present invention.
Figure 2:
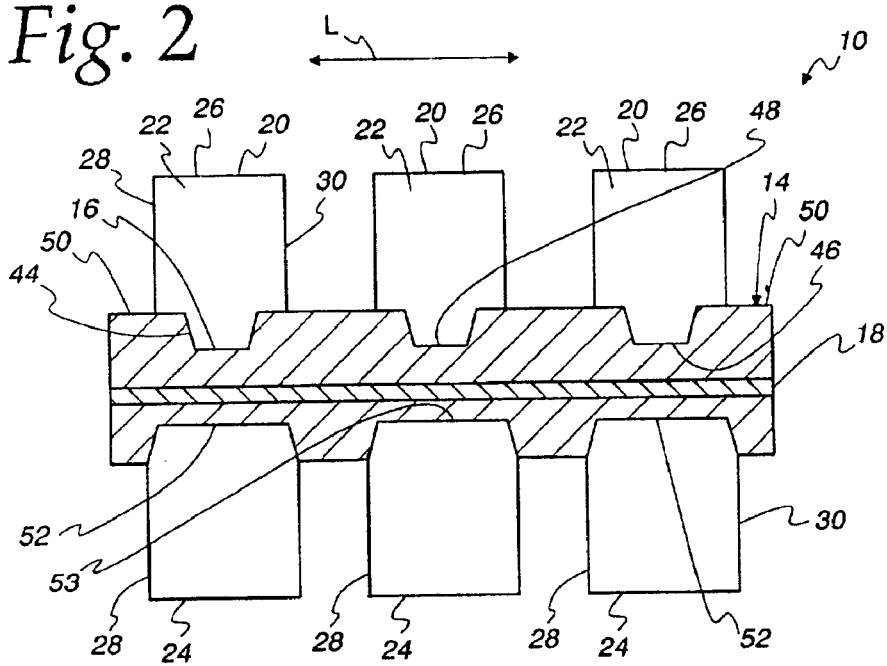
FIG. 2 is a cross-sectional view of the power transmission belt taken along line 2—2 of FIG. 1.
Figure 1:
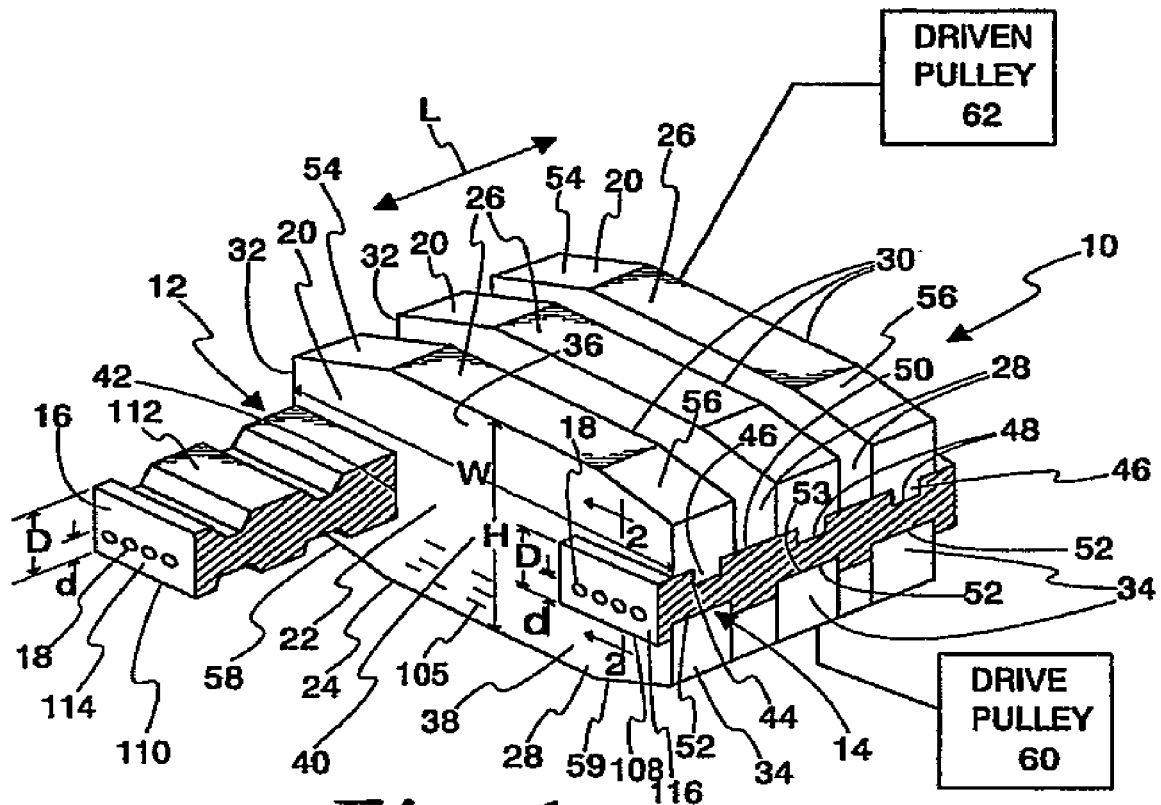
Figure 2:
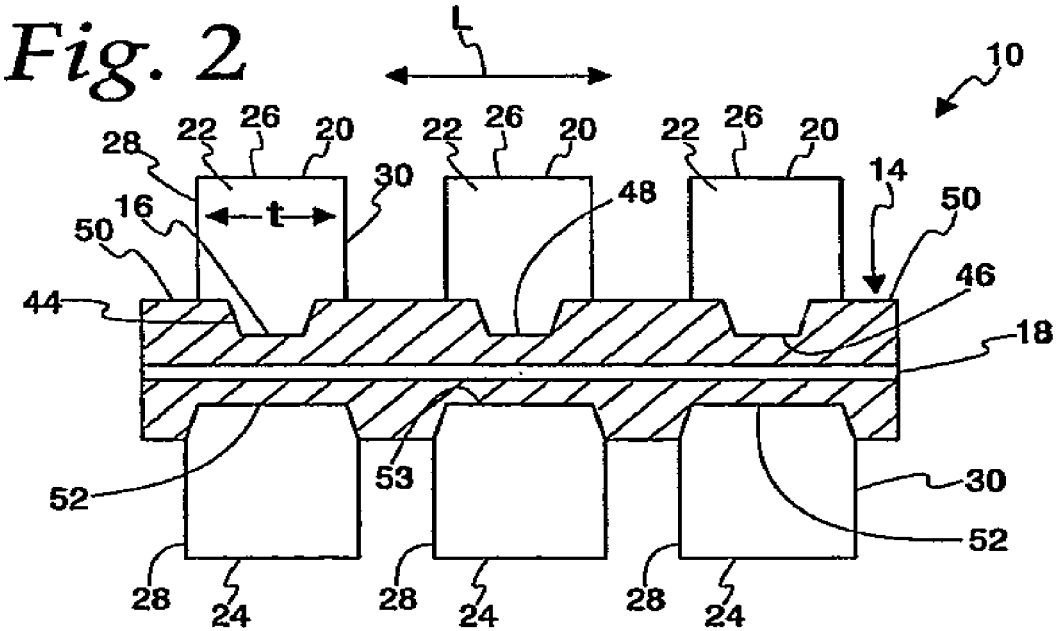
Figure 4:
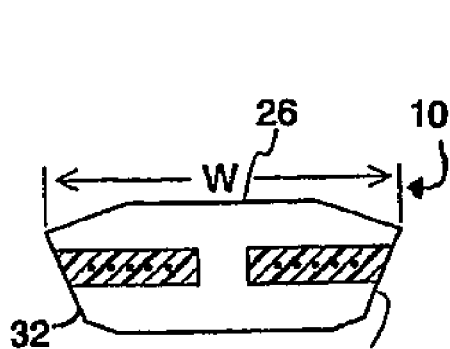
FIG. 4 is an end view of a block on the power transmission belt of FIG. 1.

One form of high load power transmission belt, according to the present invention, is shown in FIGS. 1, 2 and 4 at 10. The belt 10 consists of two laterally spaced, load carrying bands 12, 14, each having substantially the same construction, and extending in a lengthwise direction, as indicated by the double-headed arrow L. Each load carrying band 12, 14 has a body 16 made from an elastomer material and having a load carrying member 18, in rope form, spirally wrapped and embedded therewithin.

The load carrying bands 12, 14 cooperate with a plurality of blocks 20, which are attached to the load carrying bands 12, 14 at preselected, spaced intervals along the length of the load carrying bands 12, 14. The blocks 20, which each have the same construction, have a body 22 with an inside surface 24 and an outside surface 26. The blocks 20 have a height (H) between the inside and outside surfaces 24, 26. The blocks 20 have a thickness (t) between oppositely facing leading/trailing surfaces 28 and trailing/leading surfaces 30. The blocks 20 have laterally oppositely facing, pulley engaging side surfaces 32, 34, between which the belt width (W) is defined.

Each block 20 has an upper beam 36, a lower beam 38, and a center pillar 40 connecting between the upper and lower beams 36, 38 midway between the side surfaces 32, 34.

Two laterally oppositely opening recesses 42, 44 are formed in each block 20 for reception of the load carrying bands 12, 14, respectively. At the recess 44 on each block, the upper beam 36 has an inwardly projecting rib 46 which fits within a complementary recess 48 in the outside surface 50 of the load carrying band 14. The load carrying band 14 has an inwardly opening recess 52 which is complementary to an upwardly facing surface 53 on the lower beam 38 bounding the recess 44, so that surface 53 fits snugly therewithin. The recesses 48, 52 in the load carrying band 14 are spaced at regular, preselected intervals, to make keyed engagement with the load carrying band 14 along its length. Through this arrangement, the load carrying band 14 is snugly received in the block recesses 44 so that the blocks 20 and the load carrying band 14 are positively held against relative lengthwise movement. The blocks 20 cooperate with the load carrying band 12 in a similar manner.

The blocks 20 have inclined surfaces 54, 56 at the top thereof between the outside surfaces 26 and the side surfaces 32, 34, respectively, and similar inclined surfaces 58, 59 connecting between the inside surfaces 24 and the side surfaces 32, 34, respectively. The sides of the blocks 20 are configured to fit in V grooves of cooperating drive and driven pulleys 60, 62, respectively. Upon receipt of power from the drive pulley 60, the blocks 20 pull the load carrying bands 12, 14 so as to transmit power from the drive pulley 60 to the driven pulley 62.

Figure 3:
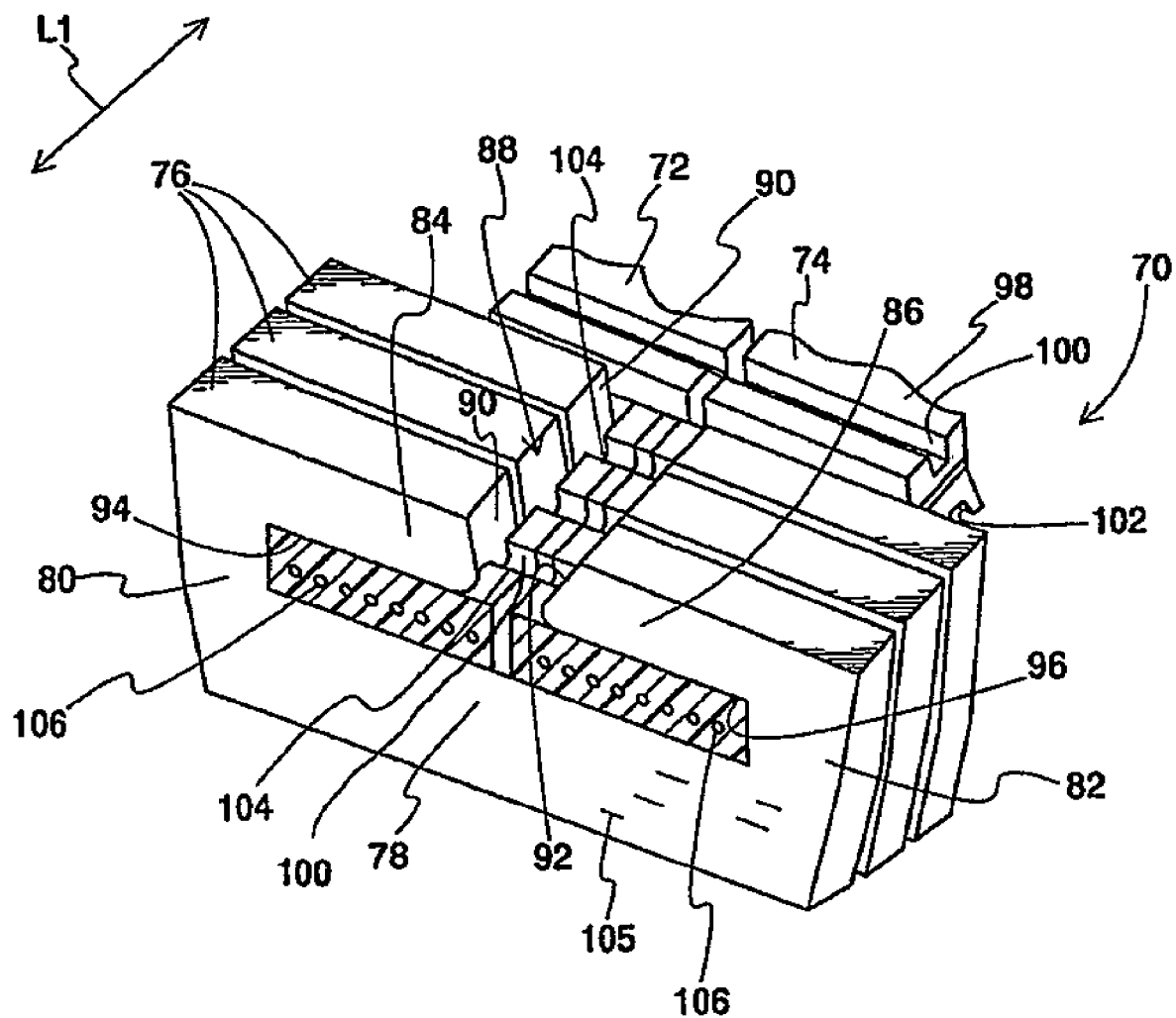
FIG. 3 is a view as in FIG. 1 of a modified form of power transmission belt.

Another form of power transmission belt, according to the present invention, is shown at 70 in FIG. 3. The power transmission belt 70 has laterally spaced, similarly configured, load carrying bands 72, 74, which cooperate with a plurality of blocks 76, each having the same configuration and attached to the load carrying bands 72, 74 at preselected, spaced intervals along the length of the load carrying bands 72, 74. The length of the power transmission belt, and load carrying bands 72, 74, is indicated by the double-headed arrow L1.

Each block 76 consists of an inner beam 78 and side pillars 80, 82 projecting upwardly/outwardly from the inner beam 78 at laterally opposite sides of the belt 70. Locking portions 84, 86 on the blocks 76 extend from the side pillars 80, 82 towards the center of the belt 70 so that a space 88 is defined between the free ends 90, 92 of the locking portions 84, 86. The space 88 defines an entry channel for introducing the load carrying bands 72, 74 into inwardly opening, U-shaped receptacles 94, 96 for the load carrying bands 72, 74, respectively.

The load carrying bands 72, 74 have the same configuration. Exemplary load carrying band 74 has a body 98 with similarly shaped outwardly and inwardly opening recesses 100, 102, which are equally spaced and at the same lengthwise location on opposite sides of the body 98. The recesses 100, 102 receive complementary ribs 104, projecting oppositely towards each other into the receptacle 96 from the locking portion 86 and inner beam 78 (exemplary ribs 104 shown on the locking portion 84 for the load carrying band 72).

The load carrying bands 72, 74 are directed through the entry channel 88 into the receptacles 94, 96 in such a manner that the ribs 104 and recesses 100, 102 intermesh and thereby consistently locate the blocks 76 at the desired lengthwise spacing and positively fix the blocks 76 and load carrying bands 72, 74 against relative lengthwise movement.

The blocks 20, 76 are made from a synthetic resin material and do not have embedded therein any shape-determining insert. A "shape-determining insert", as used herein, means an insert that maintains the shape of a significant portion of the block 20, 76. For example, a rigid element or skeletal structure that determines a dimension or shape of a substantial portion of the block 20, 76 is a shape-determining insert, whereas short reinforcing fibers that increase rigidity are not. Typically, shape-determining inserts are made of metal, such as an aluminum alloy, or the like. Typically, reinforcing fibers, whiskers or the like, are added to a synthetic resin material to increase the resistance of the blocks 20, 76 to a force, but not to maintain a predetermined shape.

Blocks that do not have shape-determining inserts generally have advantages over those that do. Generally, the blocks without shape-determining inserts are lighter in weight and less subject to generating detrimental centrifugal forces during high speed operation.

On the other hand, blocks without shape-determining inserts are generally less resistant to edgewise pressure and may deform easily upon loading of the belt. While the block becomes more deformable, poorer transmission capabilities may result. Further, repeated deformation of the block may cause the belt to be considerably deteriorated, which may lead to a shortened belt life. Consequently, blocks without shape-determining inserts are generally used in less demanding environments, such as on motorcycles, and the like, where relatively low load capability is sufficient.

To improve the operating characteristics of a belt using a block with no shape-determining insert therein, blocks 20, 76, according to the present invention, are preferably made from a synthetic resin with a bending modulus of 15 to 20 GPa, determined at 23° C. in accordance with ASTM D790. Further, the block thickness (t) and width (W) are selected so that the ratio of t/W is within the range of 0.11 to 0.20. It has been found that blocks within these parameters, even lacking a shape-determining insert, have a controlled deformation under load so that the resulting belts 10, 70 have a good power transmission capability and adequate belt life.

It has been found that if the t/W ratio is less than 0.11, the blocks 20, 76 tends to readily skew and become buckled, which may lead to the destruction of the belt in a relatively short time period. If the t/W ratio is more than 0.20, the blocks 20, 76 become quite thick, albeit less deformable. If the belt becomes too thick, the spacing between the blocks 20, 76 may have to be increased, as a result of which energy is dissipated by impingement of the blocks on the cooperating pulleys. The belt, by reason of being more rigid, may become polygonally shaped around the pulleys. This may cause potential vigorous vibration of the belt in the pulley, which could generate significant loud noise. This may also shorten the useful life of the belt.

Resins useful to construct the blocks 20, 76, may be selected from synthetic resins such as polyamide resin, polyamide imide resin (PAI), polyphenylene sulfide resin (PPS), polybutylene terephthalate resin (PBT), polyimide resin (PI), polyether sulfone resin (PES), polyether ether ketone resin (PEEK), and the like. Resins are preferred which have a low frictional coefficient and thus excellent wear resistance. It is also desirable that the resins be rigid in nature, elastic under bending forces, and resistant to breakage. Polyamide resin, and particularly nylon 46, are desirable materials for construction of the blocks, 20, 76. Nylon 46 is highly ductile compared to other polyamides, and may be less prone to breakage and fracture. Long belt life may be anticipated.

The synthetic resin in the blocks 20, 76 can be mixed with reinforcing fibers or whiskers, hereinafter referred to collectively as "fibers" 105. The amount of fiber reinforcement is preferably in the range of 15 to 40 wt. %.

Less than 15 wt. % is undesirable as this amount generally does not sufficiently reinforce the block, as a result of which the block may not exhibit the desired wear resistance. If more than 40 wt. % is used, it may be difficult to thoroughly mix the reinforcing fibers with the resin. The resulting mixture further does not lend itself to formation by injection molding.

Reinforcing fibers 105, to be added to the synthetic resin, are preferably at least one of aramid fiber, carbon fiber, glass fiber, polyamide fiber, polyester fiber, and the like. Of these fibers, carbon fiber is preferred in combination with nylon 46 to form the blocks 20, 76. Carbon fiber compensates for undesired water absorption that nylon 46 experiences and may enhance the rigidity of the resin considerably, potentially thereby advantageously improving wear resistance, shock resistance, and fatigue resistance for the nylon 46. Carbon fiber of a PAN type is preferred. When the carbon fiber is used with aramid fiber, the resulting block can be made highly ductile and highly resistant to wear and to shock.

Carbon fiber of the PAN type has a good affinity to synthetic resin. The fiber length is preferably in the range of 1–5 mm. Less than 1 mm may result in unsatisfactory reinforcement of the blocks 20, 76. Use of carbon fibers of a length of greater than 5 mm may make it difficult to knead with the resin and may result in folding of the fibers during the kneading process.

With the above reinforcing fibers 105, inorganic fibers may also be added which include whiskers, induced from zinc oxide, potassium titanate, aluminum borate, and the like, in addition to the organic fibers described above. Zinc oxide whiskers are preferred among these whiskers. This whisker has a steric configuration with the hands stretched in every direction like a tetrapod. The zinc oxide whisker, by itself, is excellent in terms of heat resistance and wear resistance. When mixed with a carbon fiber, the zinc oxide whiskers prevent the fiber from being oriented, since it is sterically configured, as described above. This gives reduced anisotropy as to warping and molding shrinkage during molding of the blocks. In addition, due to the orientation of the carbon fiber, anisotropic strengths such as ductility, flexing rigidity, and the like, can be decreased. Additionally, the friction coefficient can be stabilized with enhanced wear resistance.

Further, because of the high specific gravity and high rigidity of the zinc oxide whiskers, they are capable of reducing friction during impingement of the belts 10, 70 on cooperating pulleys, thereby potentially decreasing noise generation. Too small an amount of the zinc oxide whiskers may not have any significant effect. Too large an amount of the whiskers may make it difficult to knead and mold the composition.

The blocks 20, 76 may be improved with respect to lubricity by mixing, in addition to the above-mentioned materials, at least one selected from molybdenum disulfide, graphite, and fluorine resin. The fluorine resin includes polytetrafluoroethylene (PTFE), polyfluoroethylene propylene ether (PFPE), tetrafluoroethylene-hexafluoropropylene copolymer (PFEP), polyfluoroalkoxyethylene (PFA), and the like.

The power transmission belt, as described above, is commonly used in speed changing system wherein a wide range of speed variation is desired. Pulleys with effectively small diameters are commonly used in these systems. When the belts 10, 70 are operated on a small diameter pulley and vigorously flexed, the elastomer on the inside surface of the belts may be sharply compressed. The load carrying bands 12, 14, 72, 74 may deteriorate under the influence of stress, with the result that the elastomer, and the resinous block, may become softened or otherwise deteriorated.

To address this problem, the load carrying members 18 in the belt 10, and similar, spirally wrapped load carrying members 106 in the load carrying bands 72, 74 on the belt 70, are strategically positioned between the inside and outside of the load carrying bands 12, 14, 72, 74. The strategic location is the same on the bands 12, 14, 72, 74 for the belts 10, 70, and discussion herein will be limited to the load carrying members 18 in the exemplary belt 10, shown at FIGS. 1 and 2.

The load carrying member 18, in exemplary load carrying band 14, is located closer to the inside surface 108 of the load carrying band 14 than the outside surface 50 thereof. "Inside" and "outside" designations may change depending upon the manner in which the belts 10, 70 are flexed. "Inside" refers to the belt portion in compression, with "outside" designating the portion of the belt in tension. The lengthwise centers of the load carrying members 18 are displaced towards the inside of the load carrying bands 12, 14. In operation, the load carrying bands 12, 14 flex along the center line of the load carrying members 18, which define the neutral axis. The elastomer outside of the load carrying members 18 is in tension, whereas elastomer inside of the load carrying members 18 in compression.

In the power transmission belt 10, with the load carrying bands 12, 14 interlocked with the blocks 20, the load carrying bands 12, 14 are sandwiched between the blocks 20. The belt is flexed so as to compress the elastomer inside of the load carrying members 18. Generally, with belts of this type, no space exists to relieve the compressive force exerted on the elastomer. This condition tends to result in the buildup of a considerable amount of internal heat.

To address this problem, the load carrying members 18 are positioned nearer to the inside of the load carrying bands 12, 14, than to the outside thereof. This reduces the thickness of the elastomer inside of the load carrying members 18. As a result, there is a lesser volumetric compression, which results in less heat generation, thereby potentially prolonging the useful life of the belt.

As seen in FIGS. 1 and 2, the load carrying band 14 has a height dimension (D) between the outside surface 50 and an oppositely facing inside surface 108. The dimension d between the inside surface 108 and the center line of the load carrying member 18 is preferably selected to be 30–48% of the thickness D of the load carrying band 14. A similar arrangement of the load carrying member 18 is provided on the load carrying band 12 between inside and outside surfaces 110, 112, respectively.

In addition to reducing the likelihood of excessive heat generation, the location of the load carrying members 18, as described above, potentially eliminates the likelihood that the load carrying members 18 become impaired by the blocks 20 due to too small a thickness of the elastomer in the compression portions 114, 116 of the load carrying bands 12, 14, inside the load carrying members 18. Sufficient thickness in the compression section reduces the likelihood of breakage thereat.

Material suitable for use as an elastomer in the load carrying bands 12, 14, 72, 74 preferably is at least one of chloroprene rubber, natural rubber, nitrile rubber, styrene-butadiene rubber, hydrogenated nitrile rubber, and polyurethane rubber.

Figure 5:
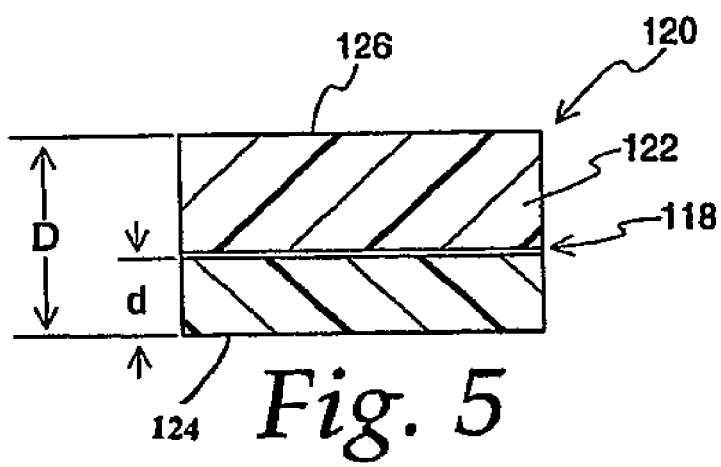
FIG. 5 is a schematic, cross-sectional view of a modified form of power transmission belt, according to the present invention.

The load carrying members 18, 106 can be in the form of a rope formed from at least one of polyester fiber, polyamide fiber, aramid fiber, glass fiber, steel wire, and the like. In addition to the spirally wrapped and embedded rope, sheets can be used, as shown generically at 118 in FIG. 5 in a load carrying band 120. The load carrying band 120 has a body 122 with an inside surface 124 and an outside surface 126 spaced by a dimension D. The sheet 118 extends lengthwise of the load carrying band 120 and is spaced a distance d from the inside surface 124. The distance d is selected so that the center line of the load carrying member 118, in sheet form, is closer to the inside surface 124 than to the outside surface 126. The distance d is preferably in the same range as described for the load carrying members 18, 106 in the embodiments shown in FIGS. 1, 2 and 4.

The load carrying sheet member 118 may be in the form of woven cloth, knitted cloth, made from the above mentioned fibers, metal sheet, and the like, or a combination thereof.

Generally, the blocks 20, 76, made as described above, tend to show good rigidity, ductility, and the like, to a sufficient extent as to exert adequate resistance to edgewise pressure resulting from impingement of the blocks 20, 76 on a cooperating pulley. At the same time, the blocks 20, 76 may exhibit excellent wear resistance and also good resistance to heat generated from friction against a cooperating pulley. As result, the blocks 10, 76 are generally effective in transmitting power from a pulley, through a pulling force, on the load carrying bands 14, 16, 72, 74, to produce a high load power transmission belt.

Accordingly, a high load power transmission belt may be made with relatively lightweight blocks which have good pulley strength and durability and which are capable of exhibiting these properties while being operated at relatively high speeds.

The effectiveness of the invention is demonstrated by testing, as described below.

In one form of testing, high load transmission belts provided with blocks having a different t/W ratios were produced. Running testing was performed with each belt and performance determined.

INVENTIVE EXAMPLE NO. 1

A power transmission belt was constructed with a block as shown in FIG. 1.

The block was made from Stanyl TW200 B6 (manufactured by Japan Synthetic Rubber Co., Ltd.). The block composition was formulated by mixing 30 parts by weight of carbon fiber with 100 parts by weight of nylon 46. The t/N ratio of the block was set at 0.14. The belt was operated under the conditions described in Table 1, below, to determine durability and amount of noise generation.

TABLE 1

|  | Drive | Driven |
|---|---|---|
| Pulley diameter (mm) | 70 | 140 |
| Revolution (rpm) | 5000 | 2500 |
| Torque (kgfm) | 4 | — |
| Axial load (kgf) | 150 | |
| Belt pitch width (mm) | 18 | |
| Pitch perimeter (mm) | 800 | |

The results of the testing of this and other belts are shown in Table 2, below.

TABLE 2

|  | Inventive Examples | | | Comparative Examples | | | |
|---|---|---|---|---|---|---|---|
|  | 1 | 2 | 3 | 1 | 2 | 3 | 4 |
| t/W | 0.14 | 0.17 | 0.20 | 0.08 | 0.10 | 0.22 | 0.24 |
| Durability time (hr) | >300 | >300 | >300 | 12 | 58 | 253 | 165 |
| Noise (dB) | 82 | 84 | 87 | 89 | 88 | 95 | 98 |

INVENTIVE EXAMPLE NO. 2

A high load transmission belt, as in Inventive Example No. 1, was produced, with the exception that the t/W ratio of the block was 0.17. Running testing was performed, with the results shown in Table 2, above.

INVENTIVE EXAMPLE NO. 3

A high load power transmission belt, as in Inventive Example No. 1, was produced, except that the t/W ratio of the block was 0.20. Running testing was performed, with the results shown in Table 2, above.

Comparative Example No. 1

A high load power transmission belt, as in Inventive Example No. 1, was produced, except that the t/W ratio of the block was 0.08. Running testing was performed, with the results shown in Table 2, above.

Comparative Example No. 2

A high load power transmission belt, as in Inventive Example No. 1, was produced, except that the t/W ratio of the block was 0.10. Running testing was performed, with the results shown in Table 2, above.

Comparative Example No. 3

A high load power transmission belt, as in Inventive Example No. 1, was produced, except that the t/W ratio of the block was 0.22. Running testing was performed, with the results shown in Table 2, above.

Comparative Example No. 4

A high load power transmission belt, as in Inventive Example No. 1, was produced, except that the t/W ratio of the block was 0.24. Running testing was performed, with the results shown in Table 2, above.

As can be seen from the results in Table 2, above, the belts of Inventive Example Nos. 1 and 2 were durable for a long belt life and ran quietly. Inventive Example No. 3 generated some significant noise, due to the higher pitch of the block. The noise generation was at an acceptable level.

In Comparative Examples Nos. 1 and 2, the blocks crooked and buckled in the direction of travel within a short period of time, resulting in cutting of the belts.

Comparative Example No. 3 did not have any block deformation but did suffer from belt cutting. This may have resulted from fatigue of the load carrying member.

Comparative Example No. 4 used a higher block pitch than was used for Comparative Example No. 3, resulting in increased belt friction and thus increased noise generation.

Additional testing was done with high load power transmission belts with load carrying members at different inner/outer locations in load carrying bands. Running testing was conducted for each belt to determine the performance thereof.

INVENTIVE EXAMPLE NO. 4

In the tested high load power transmission belt, a block as shown in FIG. 1 was used. The block was formulated by mixing 30 parts by weight of carbon fiber with 100 parts by weight of nylon 46. Hydrogenated nitrile rubber was used in forming an elastomer for a load carrying band. The load carrying member was a rope made from aramid fiber which was spirally wrapped and embedded in the elastomer. The load carrying member was positioned so that it was spaced on the inside surface of the load carrying band a distance equal to 43% of the overall thickness of the load carrying band, between the inside surface and outside surface.

The resulting belt was operated under the conditions listed in Table 3, below, to measure belt life.

TABLE 3

|  | Drive | Driven |
|---|---|---|
| Pulley diameter (mm) | 60 | 120 |
| Revolution (rpm) | 5000 | 2500 |
| Torque (kgfm) | 3 | — |
| Axial load (kgf) | | 150 |
| Belt pitch width (mm) | | 18 |
| Pitch perimeter (mm) | | 800 |

The results of the testing for this, and one additional belt, are shown in Table 4, below.

TABLE 4

|  | Inventive Example 4 | Comparative Example 5 |
|---|---|---|
| Tensile member positioning (%) | 43 | 50 |
| Lifetime (hr) | 300 or over | 218 |
| Failure phenomenon | — | broken lower beam |

Comparative Example No. 5

A high load power transmission belt was produced in the same manner as for Inventive Example No. 4, except that the load carrying member was positioned at a region midway between the inside and outside surfaces of the load carrying band. Running testing was carried out, with the results shown in Table 4, above.

As evidenced by the results in Table 4, above, Inventive Example No. 4 showed a longer useful life. In contrast, Comparative Example No. 5 had a shortened life, with failure due to a broken lower beam. It is believed that this failure is attributable to the fact that the block made from nylon 46 was softened and broke as a result of heat generation during compression of the elastomer on the inside, compression portion of the load carrying band.

The foregoing disclosure of specific embodiments is intended to be illustrative of the broad concepts comprehended by the invention.

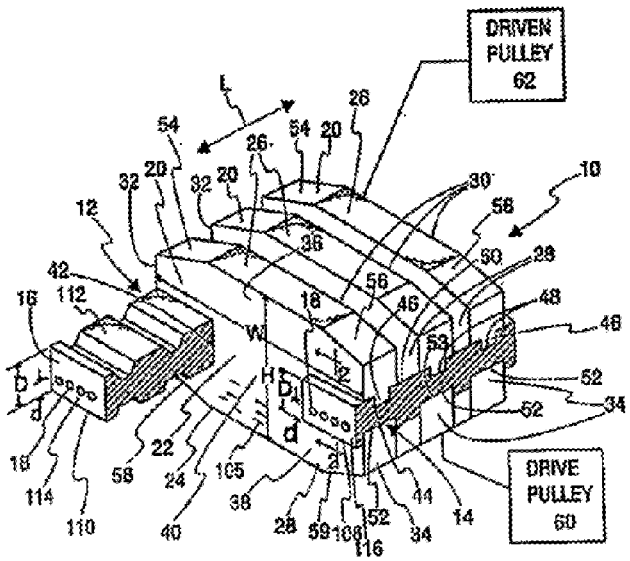

What is claimed is:

1. A power transmission belt comprising:
a load carrying band having a length; and
a plurality of blocks attached to the load carrying band at preselected spaced intervals along the length of the load carrying band,
wherein the plurality of blocks have a thickness (t) measured in a direction along the length of the load carrying band and a width (W) measured in a direction transversely to the length of the load carrying band,
wherein each of the plurality of blocks comprises synthetic resin material and has no shape-determining insert therein,
wherein the synthetic resin material comprises synthetic resin having a bending modulus of 15 to 20 GPa,
wherein the ratio of t/W is from 0.11 to 0.20,
wherein the synthetic resin material comprises polyamide resin,
wherein reinforcing fibers are present in the polyamide resin in an amount of from 15 to 40 wt. %,
wherein the polyamide resin comprises nylon 46.

2. The power transmission belt according to claim 1 wherein the reinforcing fiber comprises carbon fiber.

3. A power transmission belt comprising:
a load carrying band having a length; and
a plurality of blocks attached to the load carrying band at preselected spaced intervals along the length of the load carrying band,
wherein the plurality of blocks have a thickness (t) measured in a direction along the length of the load carrying band and a width (W) measured in a direction transversely to the length of the load carrying band,
wherein each of the plurality of blocks comprises synthetic resin material and has no shape-determining insert therein,
wherein the synthetic resin material comprises synthetic resin having a bending modulus of 15 to 20 GPa,
wherein the ratio of t/W is from 0.11 to 0.20,
wherein the synthetic resin material comprises polyamide resin,
wherein reinforcing fibers are present in the polyamide resin in an amount of from 15 to 40 wt. %,
wherein the reinforcing fiber comprises carbon fiber.

4. A power transmission belt comprising:
a load carrying band having a length; and
a plurality of blocks attached to the load carrying band at preselected spaced intervals along the length of the load carrying band,
wherein the plurality of blocks have a thickness (t) measured in a direction along the length of the load carrying band and a width (W) measured in a direction transversely to the length of the load carrying band,
wherein each of the plurality of blocks comprises synthetic resin material and has no shape-determining insert therein,
wherein the synthetic resin material comprises synthetic resin having a bending modulus of 15 to 20 GPa,
wherein the ratio of t/W is from 0.11 to 0.20,
wherein the load carrying band comprises an elastomer material,
wherein the load carrying band comprises a load carrying member extending lengthwise of the load carrying band and embedded in the elastomer material,
wherein the load carrying band has an inside surface and an outside surface and a height between the inside surface and the outside surface, and the load carrying member has a center that is located outwardly from the inside surface a distance from 30 to 48% of the height of the load carrying band.

5. A power transmission belt comprising:
a load carrying band having a length and a center; and
a plurality of blocks attached to the load carrying band at preselected spaced intervals along the length of the load carrying band,
wherein the load carrying band comprises a load carrying member extending lengthwise of the load carrying band,
wherein the load carrying band has an inside surface and an outside surface and a height between the inside surface and the outside surface, and the load carrying member is located closer to the inside surface than to the outside surface of the load carrying band,
the center of the load carrying member located outwardly from the inside surface a distance from 30 to 48% of the height of the load carrying band.

6. The power transmission belt according to claim 5 wherein the load carrying band comprises an elastomer material.

7. The power transmission belt according to claim 5 wherein each of the plurality of blocks comprises synthetic resin material and has no shape-determining insert therein.

8. The power transmission belt according to claim 7 wherein the synthetic resin material comprises synthetic resin having a bending modulus of 15 to 20 GPa.

9. The power transmission belt according to claim 7 wherein the plurality of blocks have a thickness (t) measured in a direction along the length of the load carrying band and a width (W) measured in a direction transversely to the length of the load carrying band, and the ratio of t/W is from 0.11 to 0.20.

10. The power transmission belt according to claim 9 wherein reinforcing fibers are present in the plurality of blocks in an amount of from 15 to 40 wt. %.

11. The power transmission belt according to claim 5 wherein the load carrying member comprises a rope comprising at least one of: polyester fiber; polyamide fiber; aramid fiber; glass fiber; and steel wire.

12. The power transmission belt according to claim 5 wherein the load carrying member comprises a sheet.

13. The power transmission belt according to claim 12 wherein the sheet comprises at least one of: woven cloth; knitted cloth; and metal.

14. A power transmission belt comprising:

a load carrying band having a length and a center; and a plurality of blocks attached to the load carrying band at preselected spaced intervals along the length of the load carrying band, wherein the load carrying band comprises a load carrying member extending lengthwise of the load carrying band, wherein the load carrying band has an inside surface and an outside surface and a height between the inside surface and the outside surface, and the load carrying member is located closer to the inside surface than to the outside surface of the load carrying band, the center of the load carrying member located outwardly from the inside surface a distance from 30 to 48% of the height of the load carrying band, wherein each of the plurality of blocks comprises synthetic resin material and has no shape-determining insert therein, wherein the plurality of blocks have a thickness (t) measured in a direction along the length of the load carrying band and a width (W) measured in a direction transversely to the length of the load carrying band, and the ratio of t/W is from 0.11 to 0.20, wherein reinforcing fibers are present in the plurality of blocks in an amount of from 15 to 40 wt. %, wherein the reinforcing fibers comprise carbon fiber.

* * * * *

UNITED STATES PATENT AND TRADEMARK OFFICE
CERTIFICATE OF CORRECTION

PATENT NO. : 7,070,529 B2
APPLICATION NO. : 10/157613
DATED : July 4, 2006
INVENTOR(S) : Tsuji et al.

It is certified that error appears in the above-identified patent and that said Letters Patent is hereby corrected as shown below:

Delete Title page illustrating figure, and substitute therefor, new Title page illustrating figure. (attached)

Delete drawing figures 1-2, and substitute therefor drawing figures 1-2, as shown on the attached sheets.

Signed and Sealed this

Second Day of January, 2007

JON W. DUDAS
*Director of the United States Patent and Trademark Office*

United States Patent
Tsuji et al.

(10) Patent No.: US 7,070,529 B2
(45) Date of Patent: Jul. 4, 2006

(54) POWER TRANSMISSION BELT

(75) Inventors: Katsuji Tsuji, Osaka (JP); Takehiko Ito, Kakogawa (JP)

(73) Assignee: Mitsuboshi Belting Ltd. (JP)

(*) Notice: Subject to any disclaimer, the term of this patent is extended or adjusted under 35 U.S.C. 154(b) by 111 days.

(21) Appl. No.: 10/157,613

(22) Filed: May 29, 2002

(65) Prior Publication Data
US 2003/0087716 A1 May 8, 2003

(30) Foreign Application Priority Data
May 30, 2001 (JP) ............................. 2001-161648

(51) Int. Cl.
F16G 1/08 (2006.01)

(52) U.S. Cl. ............................. 474/242; 474/201

(58) Field of Classification Search ............. 474/204, 474/240, 242, 246, 255
See application file for complete search history.

(56) References Cited

U.S. PATENT DOCUMENTS
4,655,732 A * 4/1987 Takashima ............ 474/201
6,500,086 B1 * 12/2002 Serkh et al. ............ 474/245

FOREIGN PATENT DOCUMENTS
| JP | 62-151646 | 7/1987 |
| JP | 63-034342 | 2/1988 |
| JP | 02-064132 | 3/1990 |
| JP | 05-077651 | 10/1993 |
| JP | 09-025999 | 1/1997 |

OTHER PUBLICATIONS
Mark's Standard Handbook for Mechanical Engineers, McGraw-Hill, 10th Edition, Table 6.12.1.*

* cited by examiner

Primary Examiner—David A. Bucci
Assistant Examiner—Vicky A. Johnson
(74) Attorney, Agent, or Firm—Wood, Phillips, Katz, Clark & Mortimer

(57) ABSTRACT

A power transmission belt having a load carrying band with a length, and a plurality of blocks attached to the load carrying band at preselected, spaced intervals along the length of the load carrying band. The plurality of blocks have a thickness (t), measured in a direction along the length of the load carrying band, and a width (W), measured in a direction transversely to the length of the load carrying band. Each of the plurality of blocks is made from synthetic resin material and has no shape-determining insert therein. The synthetic resin material is made from a synthetic resin having a bending modulus of 15 to 20 GPa. The ratio of t/W is from 0.11 to 0.20.

14 Claims, 2 Drawing Sheets